(12) United States Patent
Uchida et al.

(10) Patent No.: US 10,706,881 B1
(45) Date of Patent: Jul. 7, 2020

(54) MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Takato Uchida, Hiratsuka Kanagawa (JP); Naomichi Ikeda, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/545,440

(22) Filed: Aug. 20, 2019

(30) Foreign Application Priority Data

Mar. 19, 2019 (JP) .................................. 2019-051306

(51) Int. Cl.
| | | |
|---|---|---|
| *G11B 5/54* | (2006.01) | |
| *G11B 5/596* | (2006.01) | |
| *G11B 5/55* | (2006.01) | |
| *G11B 33/14* | (2006.01) | |
| *G11B 5/012* | (2006.01) | |

(52) U.S. Cl.
CPC ............ *G11B 5/5543* (2013.01); *G11B 5/012* (2013.01); *G11B 33/144* (2013.01)

(58) Field of Classification Search
CPC ... G11B 5/54; G11B 5/59633; G11B 5/59638; G11B 5/59627; G11B 5/5965; G11B 5/5543; G11B 5/4813; G11B 5/5539; G11B 5/5565
USPC ... 360/75, 77.11, 77.04, 78.14, 77.07, 78.09, 360/78.12
See application file for complete search history.

(56) References Cited

U.S. PATENT DOCUMENTS

| 6,147,434 A | 11/2000 | Nakano et al. |
| 9,951,757 B2 | 4/2018 | Stasik et al. |
| 2007/0297084 A1* | 12/2007 | Lee .......................... G11B 5/54 360/75 |

FOREIGN PATENT DOCUMENTS

JP 2009-240043 A 10/2009

* cited by examiner

*Primary Examiner* — Nabil Z Hindi
(74) *Attorney, Agent, or Firm* — Kim & Stewart LLP

(57) ABSTRACT

A magnetic disk device includes a case including a magnetic disk, a magnetic head configured to read or write data from or to the magnetic disk, an actuator configured to move the magnetic head, and a humidity sensor positioned within the case to measure a humidity in the case and output a measurement value; a control circuit configured to calculate a value of a voltage to be applied to the actuator based on a displacement amount of the magnetic head and the measurement value output from the sensor, and output the calculated value; and a servo controller configured to control the actuator by applying the voltage to the actuator according to the value output by the control circuit.

20 Claims, 5 Drawing Sheets

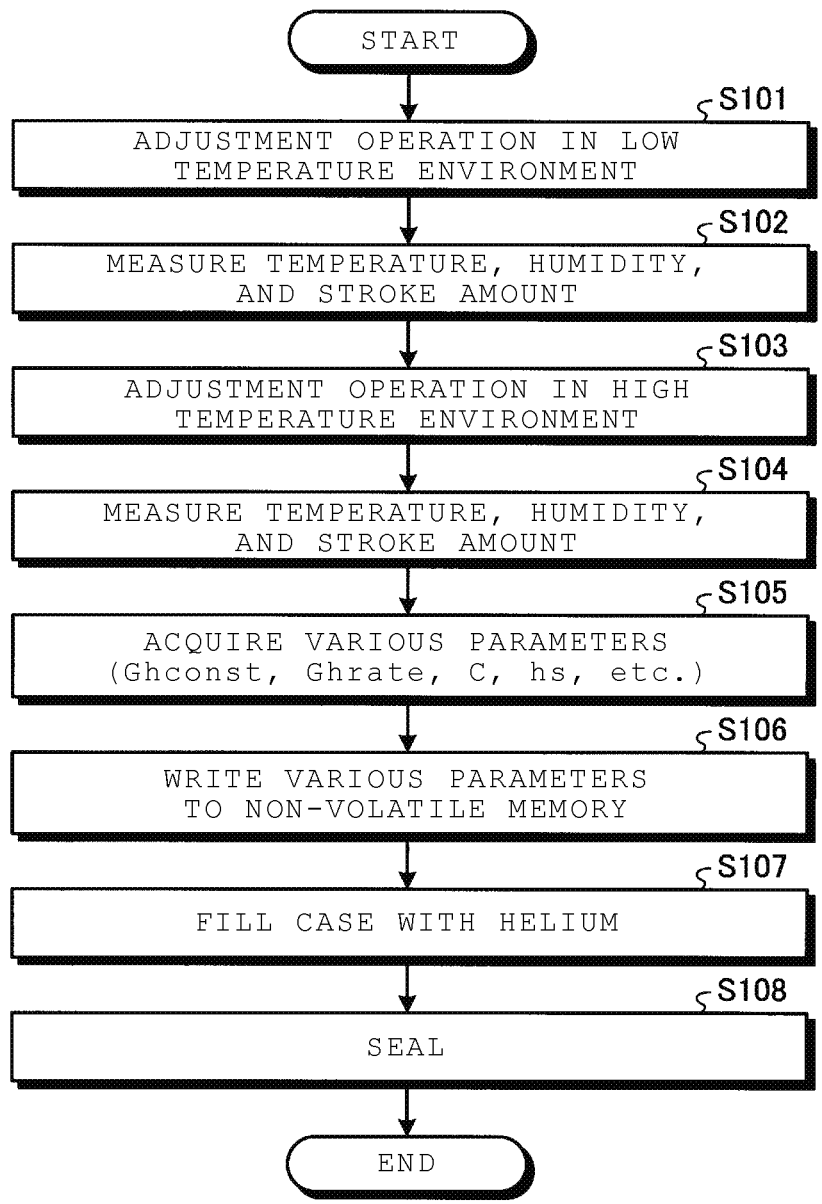

MAGNETIC DISK DEVICE

CROSS-REFERENCE TO RELATED APPLICATION

This application is based upon and claims the benefit of priority from Japanese Patent Application No. 2019-051306, filed Mar. 19, 2019, the entire contents of which are incorporated herein by reference.

FIELD

Embodiments described herein relate generally to a magnetic disk device.

BACKGROUND

In a magnetic disk device, positioning accuracy of an actuator that moves a magnetic head may be degraded due to humidity.

DESCRIPTION OF THE DRAWINGS

FIG. 3 is a flow chart illustrating a procedure executed during the manufacturing process of the magnetic disk device of the first embodiment;

DETAILED DESCRIPTION

Embodiments provide a magnetic disk device in which the deterioration in positioning accuracy due to humidity is prevented.

In general, according to one embodiment, a magnetic disk device includes a case including a magnetic disk, a magnetic head configured to read or write data from or to the magnetic disk, an actuator configured to move the magnetic head, and a humidity sensor positioned within the case to measure a humidity in the case and output a measurement value; a control circuit configured to calculate a value of a voltage to be applied to the actuator based on a displacement amount of the magnetic head and the measurement value output from the sensor, and output the calculated value; and a servo controller configured to control the actuator by applying the voltage to the actuator according to the value output by the control circuit.

Hereinafter, the magnetic disk device according to embodiments will be described in detail with reference to the accompanying drawings. The present disclosure is not limited to the embodiments.

First Embodiment

Figure 1:
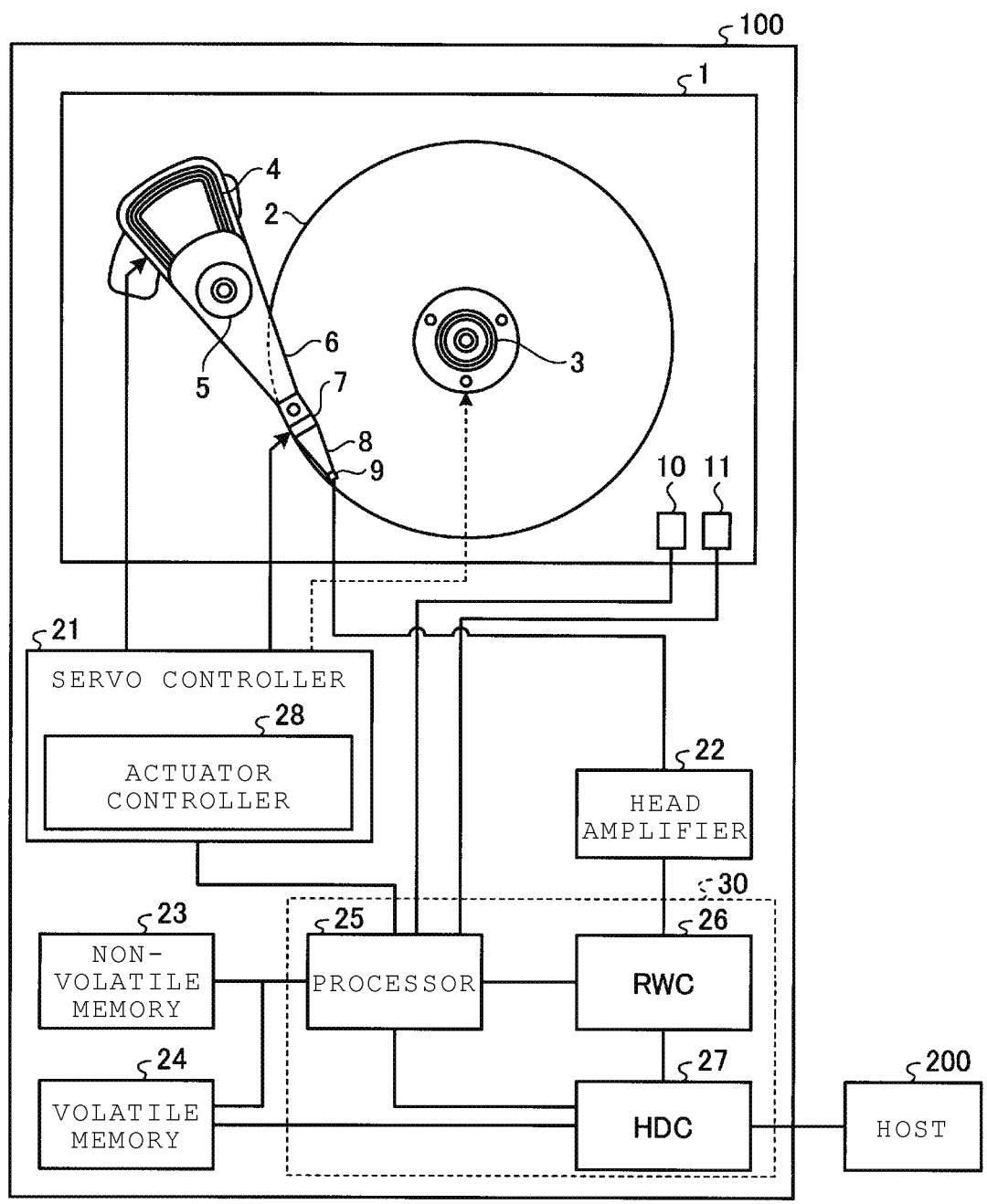
FIG. 1 is a block diagram of a magnetic disk device of a first embodiment.

FIG. 1 is a block diagram illustrating a magnetic disk device of a first embodiment.

In FIG. 1, a magnetic disk device 100 includes a magnetic disk 2, and the magnetic disk 2 is supported via a spindle 3 and. The magnetic disk device 100 includes a magnetic head 9, and the magnetic head 9 is disposed to face the magnetic disk 2.

Specifically, a voice coil motor 4 for driving an arm 6 is provided at one end of the arm 6, and a gimbal unit 8 is provided at the other end of the arm 6. The magnetic head 9 is held by the gimbal unit 8. The arm 6 is supported on the magnetic disk 2 via a rotating shaft 5.

The gimbal unit 8 includes a microactuator 7 for driving the gimbal unit 8. The voice coil motor 4, the arm 6, the gimbal unit 8, and the microactuator 7 make up a two-stage actuator of the Gimbal Micro Actuator (GMA) type.

The magnetic head 9 is moved to a position corresponding to a target position of the magnetic disk 2 by the GMA type two-stage actuator and writes data to the target position or reads data from the target position. In other words, the magnetic head 9 accesses the magnetic disk 2.

The microactuator 7 is formed by, for example, a thin film piezoelectric element. The voice coil motor 4 can coarsely move the arm 6 horizontally with respect to the recording surface of the magnetic disk 2, whereas the microactuator 7 can finely move the gimbal unit 8 horizontally with respect to the recording surface of the magnetic disk 2 by the supplied voltage.

In a case of the microactuator 7 using a thin film piezoelectric element, the displacement amount of the microactuator 7 driven by a certain voltage 7 may change depending on humidity (more precisely, relative humidity). Hereinafter, the displacement amount of the microactuator 7 per unit voltage will be referred to as a stroke amount of the microactuator 7.

Figure 2:
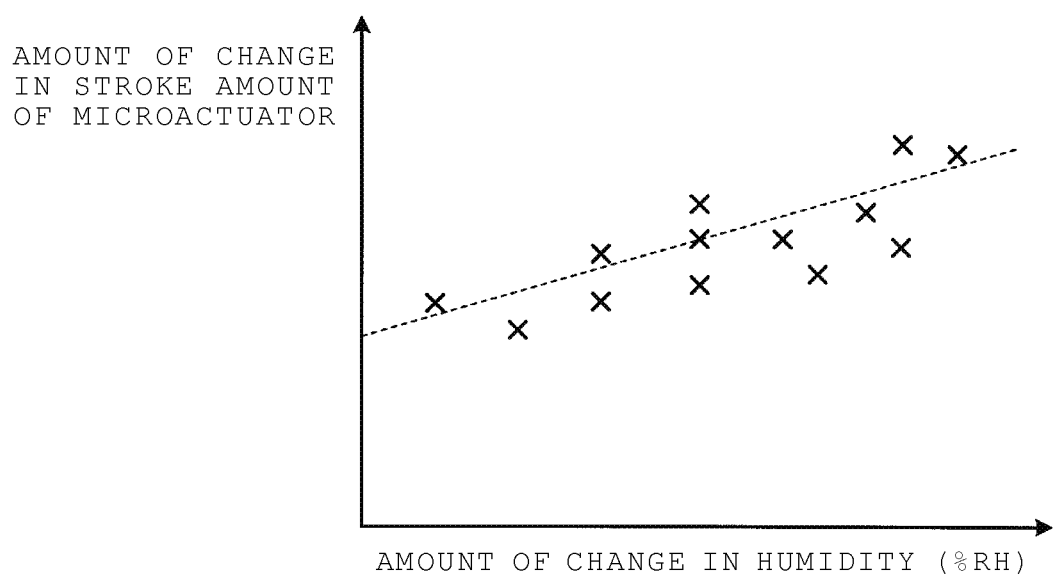
FIG. 2 is a schematic diagram illustrating a relationship between the amount of change in a stroke amount of a microactuator of the first embodiment and the amount of change in relative humidity.

FIG. 2 is a schematic diagram illustrating a relationship between the amount of change in the stroke amount of the microactuator 7 of the first embodiment and the amount of change in the relative humidity. In the example of the drawing, it can be understood that the amount of change in the stroke amount of the microactuator 7 and the amount of change in the relative humidity have a substantially linear relationship.

The amount of change in the stroke amount of the microactuator 7 depends on the humidity change because the mechanical properties represented by the elasticity of the thin film piezoelectric element, or a protective material thereof and a carrier material thereof have humidity dependency. For example, when a material including polyimide is used as a protective layer of the thin film piezoelectric element, the characteristics illustrated in FIG. 2 occur.

As described above, since the operation of the microactuator 7 depends on the humidity, when the humidity changes, the positioning accuracy is degraded and the performance of the magnetic disk device 100 is degraded.

In the first embodiment, the gain of the positioning control of the microactuator 7 is adjusted according to the humidity. Therefore, the deterioration in the positioning accuracy due to the humidity is prevented.

The explanation is returned to FIG. 1.

A humidity sensor 10 and a temperature sensor 11 are provided on a substrate on which a two-stage actuator is mounted. Further, the magnetic disk 2, the spindle 3, the voice coil motor 4, the rotating shaft 5, the arm 6, the microactuator 7, the gimbal unit 8, the magnetic head 9, the humidity sensor 10, and the temperature sensor 11 are accommodated in a case 1. The case 1 and those components accommodated in the case 1 are collectively referred to as a head disk assembly.

The case 1 is filled with helium gas. Further, the case 1 is sealed so that the helium gas does not leak.

The case 1 may include a desiccant filter for dehumidifying helium gas flowing into the case 1 when helium gas is filled in the case. The desiccant filter includes a desiccant, such as activated carbon or silica gel.

The magnetic disk device 100 further includes a servo controller 21, a head amplifier 22, a non-volatile memory 23, a volatile memory 24, a processor 25, a read/write channel (RWC) 26, and a hard disk controller (HDC) 27. The processor 25, the RWC 26, and the HDC 27 make up a control circuit 30 of the first embodiment. The components of the control circuit 30 are not limited thereto.

The head amplifier 22 supplies a write signal (i.e., current) corresponding to the write data input from the RWC 26 to the magnetic head 9. The head amplifier 22 amplifies the read signal output from the magnetic head 9 (i.e., the data read from the magnetic disk 2 by the magnetic head 9) and supplies the amplified signal to the RWC 26.

The non-volatile memory 23 includes a non-volatile memory, for example, a flash memory, or the like. The non-volatile memory 23 stores programs executed by the processor 25. The non-volatile memory 23 stores various parameters necessary for the magnetic disk device 100 to operate properly. Various parameters stored in the non-volatile memory 23 will be described below.

The volatile memory 24 includes a volatile memory such as a Dynamic RAM (DRAM) or a Static RAM (SRAM). The volatile memory 24 includes an area for buffering data to be accessed during an access from the host 200, an area for storing management information used to control the magnetic disk device 100, and the like.

The RWC 26 is a signal processing circuit. The RWC 26 encodes the write data input from the HDC 27 and outputs the encoded data to the head amplifier 22. Further, the RWC 26 decodes read data from the read signal transmitted from the head amplifier 22 and outputs the decoded data to the HDC 27.

The HDC 27 is a communication interface to communicate with a host 200. Specifically, when the HDC 27 receives a write command from the host 200, the HDC 27 stores the write data in the volatile memory 24 and returns a response to the host 200 when the write operation is completed. Further, when the HDC 27 receives a read command from the host 200, the HDC 27 returns the read data stored in the volatile memory 24 to the host 200 by the read operation.

The servo controller 21 supplies a current or a voltage to the spindle motor which rotates the spindle 3 and drives the spindle motor at a predetermined rotational speed.

In addition, the servo controller 21 controls the voice coil motor 4 and the microactuator 7 to move the magnetic head 9 to a position specified by the processor 25.

More specifically, the servo controller 21 includes an actuator controller 28. The position of the magnetic head 9 is commanded from the processor 25 to the actuator controller 28. The actuator controller 28 calculates the displacement amount of the voice coil motor 4 and the displacement amount of the microactuator 7 in order to move the magnetic head 9 to the position commanded by the processor 25. Then, the actuator controller 28 supplies a current or a voltage corresponding to the displacement amount of the voice coil motor 4 to the voice coil motor 4 and supplies a voltage corresponding to the displacement amount of the microactuator 7 to the microactuator 7.

The processor 25 is, for example, a Central Processing Unit (CPU). The processor 25 performs read and write processes by the magnetic head 9, determines the access position on the recording surface of the magnetic disk 2, instructs the access position to the servo controller 21, and the like. Further, the processor 25 executes programs stored in non-volatile storage media such as the non-volatile memory 23 and the magnetic disk 2 to perform other processes.

In the first embodiment, the processor 25 adjusts the voltage control gain of the microactuator 7. Below, an example of the method of voltage control of the microactuator 7 and an example of the method of gain adjustment in the voltage control are explained. Here, a voltage Vma supplied to the microactuator 7 is proportionally controlled. Control of the voltage Vma is not limited to the proportional control.

The voltage Vma is calculated by the following equations (1) to (4):

$$Vma = Gh * dx + C \quad (1)$$

$$Gh = Gh\text{const} + Gh\text{const} * Gh\text{rate} * dh \quad (2)$$

$$Gh\text{rate} = \{(SLh/SHh)/(hHh-hLh)\} - 1 \quad (3)$$

$$dh = hs - hr \quad (4)$$

The definition of each parameter in the equations (1) to (4) is as follows:
dx: desired displacement to MA [m]
Gh: control gain which changes according to humidity
C: constant term independent of humidity
Ghconst: control gain under constant humidity
Ghrate: humidity fluctuation gain
SLh: displacement amount of the microactuator 7 per unit voltage (e.g., per one volt) measured in a low humidity environment [m/V]
SHh: displacement amount of the microactuator 7 per unit voltage (e.g., per one volt) measured in a high humidity environment [m/V]
hLh: humidity measured in a low humidity environment [% RH]
hHh: humidity measured in a high humidity environment [% RH]
hs: humidity when the control gain is adjusted [% RH]
hr: current humidity [% RH]

The control gain Gh, which changes according to the humidity, is composed of the term. Ghconst not dependent on the humidity and the term Ghconst*Ghrate*dh dependent on the humidity, as illustrated in the equation (2).

The term Ghconst which does not depend on the humidity is determined by a predetermined adjustment method. The dh in the humidity-dependent term Ghconst*Ghrate*dh is the amount of change in humidity based on the humidity when adjusting Ghconst.

Ghrate is a constant that represents the ease of changes in the stroke amount of the microactuator 7 with respect to the change in humidity and is determined by the equation (3). That is, Ghrate is a parameter indicating a relationship between the amount of change in the stroke amount of the microactuator 7 and the amount of change in humidity. The four constants SLh, SHh, hLh, and hHh substituted into equation (3) are determined by measuring the humidity and the stroke amounts in a plurality of humidity zones in the manufacturing process of the magnetic disk device 100.

Specifically, first, in the manufacturing process, the adjustment result of Ghconst and the humidity hs acquired when the adjustment result of Ghconst is obtained are recorded in the non-volatile memory 23. Next, when the process in the manufacturing process is executed under the low humidity, SLh and hLh are measured, and when the process is executed in the manufacturing process under the high humidity, SHh and hHh are measured. Then, Ghrate is calculated based on the equation (3) and recorded in the non-volatile memory 23.

When positioning control is performed in an operating state after shipment, the processor 25 calculates the dh based on the humidity hr obtained by measurement in the operating environment and the humidity hs recorded in the non-volatile memory 23 according to the equation (4). Then, the processor 25 calculates the control gain Gh based on the dh obtained by the calculation and Ghconst and Ghrate recorded in the non-volatile memory 23 according to the equation (2).

The processor 25 sets the control gain Gh obtained by the calculation in the actuator controller 28. The actuator controller 28 calculates the voltage Vma supplied to the microactuator 7 based on a preset constant term C and the control gain Gh set by the processor 25 according to the equation (1).

That is, the processor 25 changes the control gain Gh in accordance with the detected humidity value. Accordingly, highly accurate positioning that is independent of humidity is achieved.

For example, when the microactuator 7 has a characteristic that the stroke amount becomes ten times when the humidity rises by 1 [% RH], the value of (SLh/SHh) is $\frac{1}{10}$ when the value of (hHh−hLh) is 1, and Ghrate is −0.9 (={(SLh/SHh)/(hHh−hLh)}−1=$\frac{1}{10}$−1) according to the equation (3)

When the magnetic disk device 100 equipped with such a microactuator 7 is used, if the humidity (that is, the humidity hr) is equal to the humidity hs of when the adjustment result of Ghconst is obtained, as apparent from the equation (2), the Gh is equal to Ghconst. Therefore, the voltage Vma is obtained by the calculation of Ghconst*dx+C.

On the other hand, when the humidity (that is, the humidity hr) is higher than the humidity hs by 1 [% RH], according to the equation (2), the Gh is 0.1*Ghconst. Therefore, the voltage Vma is 0.1*Ghconst*dx+C according to the equation (1). As a result, unlike the case where the humidity hr is equal to the humidity hs, the value of the gain by which the displacement amount dx is multiplied becomes $\frac{1}{10}$.

That is, even if the microactuator 7 has a characteristic that the stroke amount becomes ten times when the humidity rises by 1 [% RH], it is possible to carry out positioning control independent of humidity.

FIG. 3 is a flowchart illustrating a procedure executed during the manufacturing process of the magnetic disk device 100 of the first embodiment.

First, an adjustment operation in the low temperature environment is performed on the magnetic disk device 100 (S101). The steps from S101 to S107 are performed before the case 1 is sealed.

When the adjustment operation in the low temperature environment is performed, the temperature, the humidity, and the stroke amount are measured (S102).

Subsequently, an adjustment operation in the high temperature environment is performed on the magnetic disk device 100 (S103). The temperature, the humidity, and the stroke amount are also measured when the adjustment operation is performed in the high temperature environment (S104).

Figure 4A:
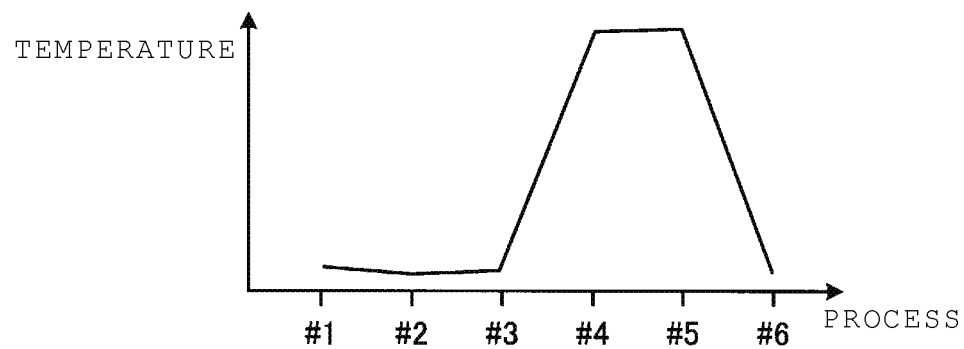
FIGS. 4A to 4C are schematic diagrams illustrating temperature, humidity, and a stroke amount of the microactuator, which are measured during the manufacturing process of the magnetic disk drive of the first embodiment.
Figure 4B:
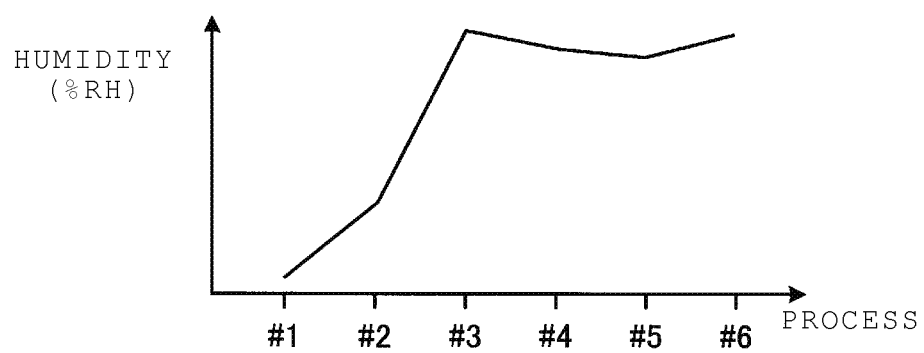
Figure 4C:
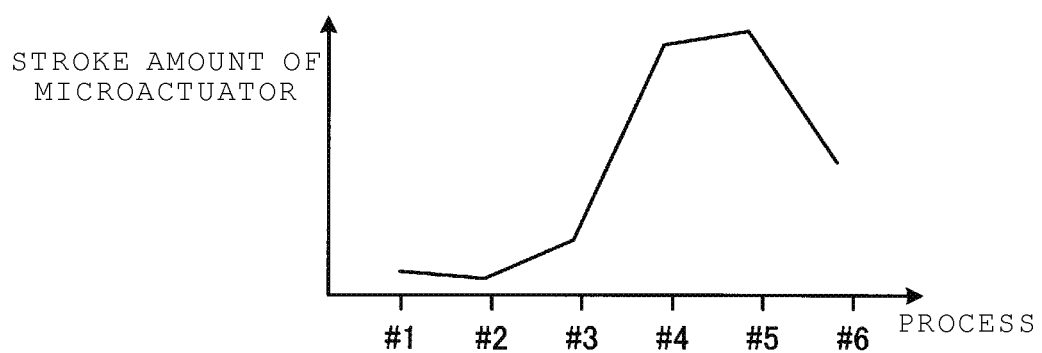

FIGS. 4A to 4C are schematic diagrams illustrating the temperature, the humidity, and the stroke amount of the microactuator 7 measured during the manufacturing process of the magnetic disk device 100 of the first embodiment under different environments.

As shown in FIGS. 4A to 4C, Process #1 to Process #3 are performed in low temperature environments, Process #4 and Process #5 are performed in high temperature environments, and Process #6 is performed in a low temperature environment.

Regarding the humidity, the humidity increases from Process #1 to Process #3 and the humidity is maintained almost constant from Process #3 to Process #6.

Regarding the stroke amount, the stroke amount increases from Process #1 to Process #4 and the stroke amount decreases from Process #5 to Process #6.

The steps S101 and S102 of FIG. 3 are carried out, for example, under the same environment as Process #1. The steps S103 and S104 of FIG. 3 are carried out under the same environment as Process #4. Therefore, the humidity and the stroke amount under different humidity environments are measured. That is, SLh, SHh, hLh, and hHh are measured.

The explanation is returned to FIG. 3.

After S104, various parameters including Ghconst, Ghrate, C, hs, and the like are acquired (S105). Ghconst and C are determined by a known method. The "hs" is measured when Ghconst is determined. The "Ghrate" is obtained by calculation based on SLh, SHh, hLh, and hHh obtained by S102 and S104 according to the equation (3).

The various parameters obtained by S105 are stored in the non-volatile memory 23 (S106). Then, the case 1 is filled with helium (S107) and the case 1 is sealed (S108). By S108, the procedure of the first embodiment executed during the manufacture of the magnetic disk device 100 is completed.

The magnetic disk device 100 may execute some or all of the processes of S101 to S106. For example, a program for the test is stored in the non-volatile memory 23. The processor 25 may execute the test program to perform some or all of the processes of S101 to S106. However, the temperature and humidity of the environment are controlled by an external device.

In addition, the magnetic disk device 100 may be connected to a test apparatus and the magnetic disk device 100 may execute some or all of the processes of S101 to S106 under the control of the test apparatus. For example, the test apparatus transmits various commands prepared for the test to the magnetic disk device 100, and the processor 25 or the HDC 27 executes some or all of the processes of S101 to S106 according to the commends.

Figure 5:
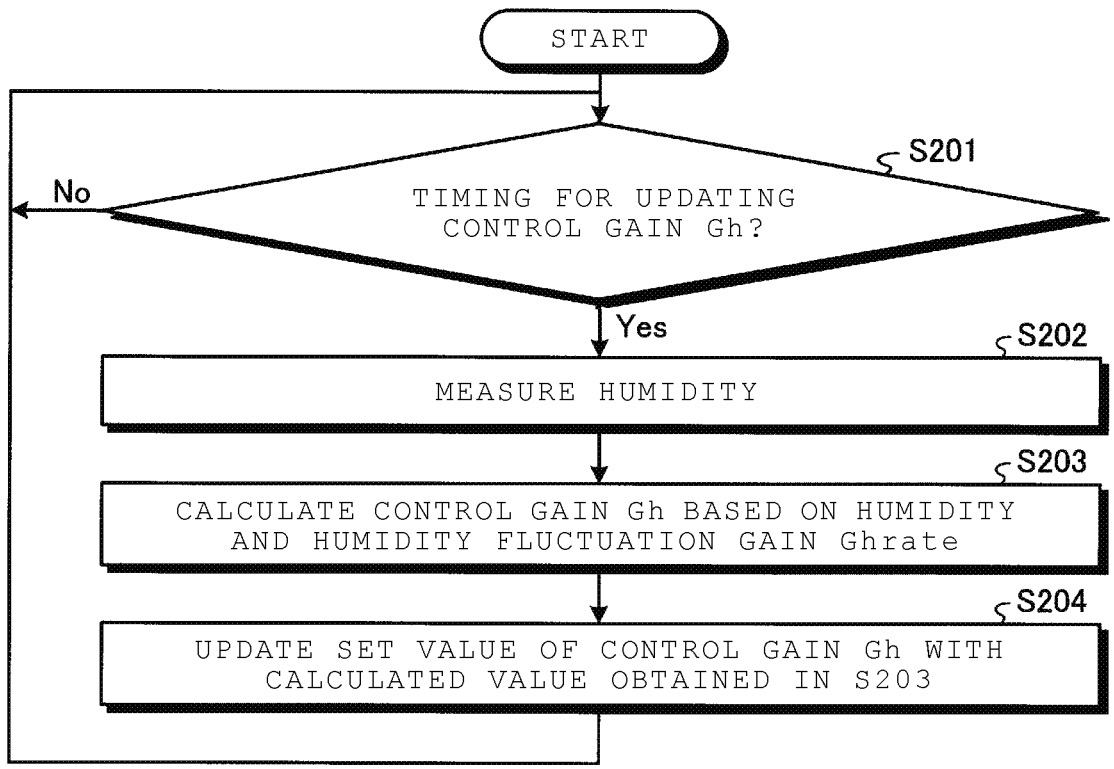
FIG. 5 is a flow chart illustrating an operation executed after shipment of the magnetic disk device of the first embodiment.

FIG. 5 is a flowchart illustrating an operation after shipment of the magnetic disk device 100 of the first embodiment, that is, an operation executed in a state where the magnetic disk device 100 is connected to the host 200.

When the magnetic disk device 100 is used, the processor 25 determines whether the timing for updating the control gain Gh has come (S201).

The control gain Gh may be updated at any timing. For example, the control gain Gh is updated every few seconds. The processor 25 may determine that the timing for updating the control gain Gh has come based on a count signal from a hardware counter (not illustrated).

In another example, the processor 25 constantly monitors the output value of the humidity sensor 10. Then, when the output value of the humidity sensor 10 deviates by a predetermined value or more from the value measured at the previous update timing of the control gain Gh, it may be determined that the update timing of the control gain Gh has come.

When the timing for updating the control gain Gh has not come (S201: No), the process of S201 is executed again. When the timing for updating the control gain Gh has come (S201: Yes), the processor 25 measures the humidity (S202). That is, the processor 25 acquires the output value of the humidity sensor 10 as the humidity hr.

Next, the processor 25 calculates the control gain Gh based on the humidity hr obtained by the measurement and the humidity fluctuation gain Ghrate recorded in the non-volatile memory 23 (S203). The processor 25 calculates the control gain Gh based on the equations (1), (2), and (4).

Next, the processor 25 transmits the calculated value of the control gain Gh acquired in S203 to the actuator controller 28, thereby updating the set value of the control gain Gh with the calculated value of the control gain Gh (S204). Then, the process of S201 is performed again.

Since the control gain Gh is sequentially updated according to the humidity, the actuator controller 28 can perform high-precision positioning control that is independent of humidity.

S201 to S204 are described to be performed by the processor 25. Some or all of S201 to S204 may be performed by the HDC 27.

In order to keep helium in the case 1, the case 1 is sealed. That is, as long as the case 1 is not damaged, the amount of water in the case 1 is constant after the process of S108 is performed. Therefore, when the amount of water in the case 1 is known, the humidity in the case 1 can be estimated from the temperature in the case 1. That is, the temperature in the case 1 can be regarded as information related to humidity.

The processor 25 may calculate the humidity in the case 1 based on the output value of the temperature sensor 11. In this case, it is possible to remove the humidity sensor 10 from the magnetic disk device 100.

It is possible to employ any sensor instead of the temperature sensor 11 and the humidity sensor 10 as long as the information corresponding to the humidity can be obtained.

The technique of the first embodiment may also be applied to a magnetic disk device other than the magnetic disk device 100 in which the case 1 is filled with helium. For example, the technique may also be applied to a magnetic disk device in which the case 1 has a hole for introducing air and the case 1 is filled with air.

As described above, according to the first embodiment, the control circuit 30 adjusts the gain of positioning control of the microactuator 7 by the servo controller 21 based on the output value of a sensor (i.e., humidity sensor 10 or temperature sensor 11) that outputs a value related to the humidity.

As a result, it is possible to prevent the deterioration in positioning accuracy due to humidity.

Further, in the non-volatile memory 23, the value of the humidity fluctuation gain Ghrate, which is a parameter indicating the relationship between the amount of change in the stroke amount of the microactuator 7 per unit voltage (e.g., per one volt) and the amount of change in humidity, is recorded. The control circuit 30 calculates the gain of the positioning control of the microactuator 7 based on the output value of the humidity sensor 10 and the humidity fluctuation gain Ghrate. Then, the control circuit 30 updates the set value of the gain of the positioning control of the microactuator 7 with the calculated value.

Therefore, since the control gain Gh is sequentially updated according to the humidity, the actuator controller 28 can execute highly accurate positioning control independent of the humidity.

In the first embodiment, the humidity fluctuation gain Ghrate is described as an example of information indicating the relationship between the amount of change in the stroke amount of the microactuator 7 per unit voltage and the amount of change in humidity. The relationship between the amount of change in the stroke amount of the microactuator 7 per unit voltage and the amount of change in humidity may be stored as any piece of information. The relationship between the amount of change in the stroke amount of the microactuator 7 per unit voltage and the amount of change in humidity may be defined by a function or a table.

Second Embodiment

In the second embodiment, another example of the method of adjusting the gain of positioning control based on the output value of the humidity sensor 10 will be described. In this embodiment, the relationship between the stroke amount of the microactuator 7 and the relative humidity is approximated by a quadratic function.

In the manufacturing process of the magnetic disk device 100, a pair of a stroke amount and humidity is measured in three or more humidity zones. Then, an approximate equation of a quadratic function is calculated from the pairs of the stroke amount and humidity measured in three or more humidity zones.

Figure 6:
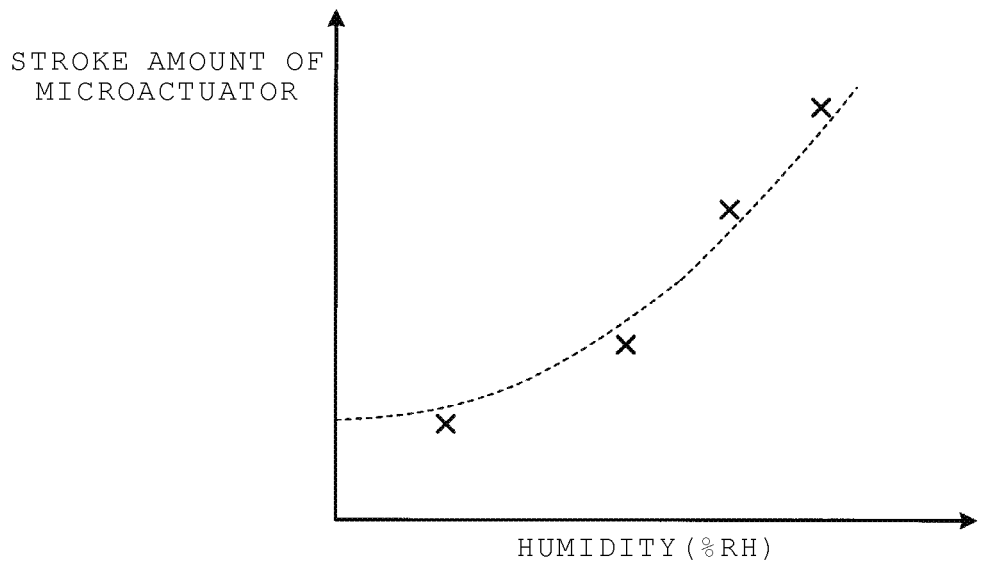
FIG. 6 is a diagram for illustrating measurement results of a stroke amount of the microactuator according to a second embodiment and humidity, and a quadratic function derived from the measurement results.

FIG. 6 is a diagram for illustrating the measurement results of the stroke amount of the microactuator 7 according to the second embodiment and the humidity and the equation of the quadratic function derived from the measurement results. In the example of this drawing, four pairs of the stroke amount of the microactuator 7 and the humidity are measured. Then, based on the four measurement results, an approximate equation of the following equation (5) is calculated:

$$DMA = a*h^2 + b*h + c \qquad (5)$$

Here, DMA is a stroke amount of the microactuator 7 and is an example of the gain of the second embodiment. A parameter h is humidity. Letters a, b, and c represent coefficients and are examples of information indicating the relationship between the stroke amount and humidity. Coefficients a, b and c are stored in the non-volatile memory 24.

The calculation method of the approximate equation is not limited to the specific method. For example, the least squares method may be employed as a method of calculating the approximate equation.

When the timing for updating the control gain DMA has come after the shipment of the magnetic disk device 100, the processor 25 obtains the control gain DMA by obtaining the output value of the humidity sensor 10 and substituting the obtained output value into h of the equation (5). The coefficients a, b, and c in the equation (5) are read from the non-volatile memory 24.

Next, the processor 25 transmits the acquired control gain DMA to the actuator controller 28.

The actuator controller 28 controls the microactuator 7 using the received control gain DMA. That is, the actuator controller 28 controls the microactuator 7 according to the following equation (6):

$$Vma = DMA*dx + C \qquad (6)$$

As described above, by approximating the relationship between the stroke amount of the microactuator 7 and the relative humidity with a quadratic function, adjustment of the gain of positioning control based on the output value of the humidity sensor 10 is achieved. The approximate equation of the relationship between the stroke amount of the microactuator 7 and the relative humidity is not limited to a quadratic function. The relationship between the stroke amount of the microactuator 7 and the relative humidity may be approximated by any non-linear function.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a case housing
      a magnetic disk,
      a magnetic head configured to read or write data from or to the magnetic disk,
      an actuator configured to move the magnetic head, and
      a humidity sensor positioned within the case to measure a humidity within the case and output a measurement value;
   a control circuit configured to
      calculate a value of a voltage to be applied to the actuator based on a displacement amount of the magnetic head per unit voltage and the measurement value output from the sensor, and
      output the calculated value; and
   a servo controller configured to control the actuator according to the value output by the control circuit.

2. The magnetic disk device according to claim 1, further comprising:
   a memory that stores information indicating a relationship between the displacement amount of the magnetic head per unit voltage and humidity, wherein
   the control circuit is configured to calculate a gain parameter based on the stored information and the measurement value, and then calculate the value of the voltage using the gain parameter.

3. The magnetic disk device according to claim 2, wherein the control circuit is configured to calculate the gain parameter at predetermined intervals.

4. The magnetic disk device according to claim 1, wherein the case is filled with a gas.

5. The magnetic disk device according to claim 1, wherein the actuator is a microactuator.

6. The magnetic disk device according to claim 1, wherein the actuator comprises a thin film piezoelectric element.

7. The magnetic disk device according to claim 6, wherein the thin film piezoelectric element comprises a protective layer formed of a material including polyimide.

8. The magnetic disk device according to claim 1, further comprising:
   a voice coil motor;
   an arm driven by the voice coil motor; and
   a gimbal unit provided at one end of the arm to hold the magnetic head, wherein
   the actuator drives the gimbal unit.

9. A magnetic disk device comprising:
   a case housing
      a magnetic disk,
      a magnetic head configured to read or write data from or to the magnetic disk,
      an actuator configured to move the magnetic head, and
      a temperature sensor positioned within the case to measure a temperature in the case and output a measurement value;
   a control circuit configured to
      calculate a value of a voltage to be applied to the actuator based on a displacement amount of the magnetic head per unit voltage and the measurement value output from the sensor, and
      output the calculated value; and
   a servo controller configured to control the actuator according to the value output by the control circuit.

10. The magnetic disk device according to claim 9, further comprising:
    a memory that stores information indicating a relationship between the displacement amount of the magnetic head per unit voltage and humidity, wherein
    the control circuit is configured to calculate a gain parameter based on the stored information and the measurement value, and then calculate the value of the voltage using the gain parameter.

11. The magnetic disk device according to claim 10, wherein
    the control circuit is configured to calculate the gain parameter at predetermined intervals.

12. The magnetic disk device according to claim 9, wherein
    the control circuit is configured to calculate a humidity based on the measured temperature, and calculate the value of the voltage based on the calculated humidity.

13. The magnetic disk device according to claim 9, wherein
    the case is filled with a gas.

14. The magnetic disk device according to claim 9, wherein
    the actuator is a microactuator.

15. The magnetic disk device according to claim 9, wherein
    the actuator comprises a thin film piezoelectric element.

16. The magnetic disk device according to claim 15, wherein
    the thin film piezoelectric element comprises a protective layer formed of a material including polyimide.

17. A method for controlling a magnetic disk device, the method comprising:
    measuring a humidity or a temperature in a case of the magnetic disk device, the case housing:
       a magnetic disk,
       a magnetic head configured to read or write data from or to the magnetic disk, and
       an actuator configured to move the magnetic head;
    calculating a value of a voltage to be applied to the actuator based on a displacement amount of the magnetic head per unit voltage and the measurement value; and
    controlling the actuator by applying the voltage to the actuator according to the calculated value.

18. The method according to claim 17, further comprising:
    storing information indicating a relationship between the displacement amount of the magnetic head per unit voltage and humidity, wherein the calculating comprises calculating a gain parameter based on the stored information and the measurement value, and then calculating the value of the voltage using the gain parameter.

19. The method according to claim 17, further comprising:

storing information indicating a relationship between the displacement amount of the magnetic head per unit voltage and temperature, wherein the calculating comprises calculating a gain parameter based on the stored information and the measurement value, and then calculating the value of the voltage using the gain parameter.

20. The method according to claim 17, wherein the gain parameter is calculated at predetermined intervals.

* * * * *